United States Patent [19]
Carlson et al.

[11] 3,731,283
[45] May 1, 1973

[54] DIGITAL COMPUTER INCORPORATING BASE RELATIVE ADDRESSING OF INSTRUCTIONS

[76] Inventors: Lewis R. Carlson, 1055-24th Ave. S.E., Minneapolis, Minn. 55414; Eugene E. Hervig, 7131 Clay Ct., South Saint Paul, Minn. 55075; Kenneth J. Oehlers, 5950 Donna Ave., Tarzana, Calif. 91356

[22] Filed: Apr. 13, 1971

[21] Appl. No.: 133,654

[52] U.S. Cl. ....................340/172.5
[51] Int. Cl. ....................G06f 9/10
[58] Field of Search ....................340/172.5; 235/157

[56] References Cited

UNITED STATES PATENTS

| | | | |
|---|---|---|---|
| 3,461,433 | 8/1969 | Emerson | 340/172.5 |
| 3,470,537 | 9/1969 | Goshorn et al. | 340/172.5 |
| 3,510,847 | 5/1970 | Carlson et al. | 340/172.5 |
| 3,303,477 | 2/1967 | Voigt | 340/172.5 |

*Primary Examiner*—Paul J. Henon
*Assistant Examiner*—Mark Edward Nusbaum
*Attorney*—Thomas J. Nikolai, Kenneth T. Grace, Donald W. Phillion and John P. Dority

[57] ABSTRACT

A relative addressing scheme for a digital computer which allows programs of instructions to be stored in the computer memory at locations which may be addressed relative to predetermined base values rather than at absolute assigned addresses to facilitate program relocation within the memory. The program address register is divided into two segments, namely, a base register selection segment and a displacement segment. During instruction acquisition, the base register selection segment is decoded to read out the contents of a selected base register and these contents are added to the displacement segment of the program address register to define the address of the instruction to be acquired.

4 Claims, 5 Drawing Figures

INVENTORS
LEWIS R. CARLSON
EUGENE E. HERVIG
KENNETH J. OEHLERS
BY Thomas J. Nikolai
ATTORNEY

DIGITAL COMPUTER INCORPORATING BASE RELATIVE ADDRESSING OF INSTRUCTIONS

BACKGROUND OF THE INVENTION

In present day computer systems that operate at extremely high computational rates, it has become desirable to store in the memory of the computer a plurality of independently operable programs, referred to as "-worker programs," and to provide an Executive program to govern the sequence in which the various instructions comprising the worker programs will be executed. The foregoing mode of operation wherein several independent worker programs are executed under control of a Executive program is commonly referred to in the art as "time-sharing."

In such time-sharing systems, it is often desirable to be able to transfer new worker programs into the computer's memory from some external storage device as well as to remove such programs from the computer's high speed memory upon completion of a given worker program. Further, in real-time applications, the Executive program may determine that a given task should have a higher priority such that control will be taken away from a given worker program undergoing execution and given to a different worker program involving a task of higher priority. This normally necessitates relocation of worker programs within the computer's main memory section.

In complex real-time systems, e.g., airline reservations systems, inventory control systems, etc., it would be a practical impossibility for the computer programmer to provide for fixed memory areas where worker programs could be temporarily stored on an absolute addressing basis. Therefore, techniques have been worked out for assigning worker programs to a memory on a relative addressing basis. For example, in the Ashbaugh et al U.S. Pat. No. 3,389,380 there is described a system wherein references to a particular instruction are made relative to a starting base address and the address of an operand to be manipulated is made relative to a starting base address at which the operands are stored in memory. A separate set of registers is then provided for storing the base address of the instructions and circuitry is provided for summing the contents of a selected one of these base address registers to the relative address of the instruction or operand to thereby form the absolute address used for accessing the memory. As long as the instructions and operands of a given worker program are stored relative to a known demarcation point it becomes a simple matter to relocate the worker programs by merely altering the contents of the base address register associated with the worker program.

The present invention relates to the aforementioned Ashbaugh et al patent to the extent that it is designed to accomplish a similar goal, i.e., providing a system for base relative addressing to thereby facilitate program relocation in the memory of a computer. The present invention is considered to be an improvement over the system described in the Ashbaugh et al patent in that it accomplishes the result with considerably less circuitry than was required to implement the base relative addressing feature described in the Ashbaugh et al patent.

Accordingly, it is the principal object of the present invention to provide an improved base relative addressing system for a multi program computer system to thereby facilitate the execution of time shared programs and to facilitate relocation of worker programs within the memory section of a computer.

Figure 1:
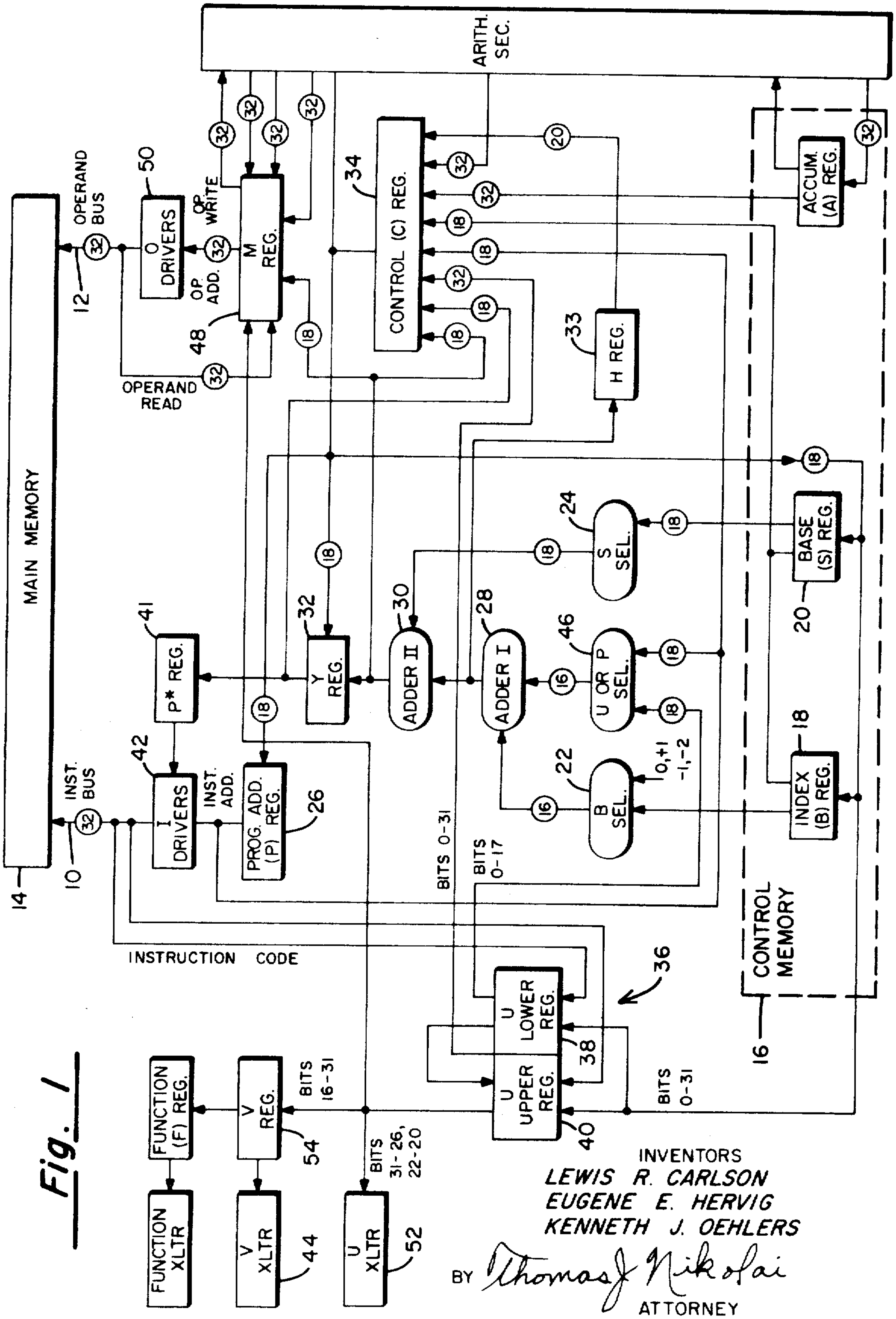
FIG. 1 is a block diagram of a data processing system which embodies the present invention.

Referring not to FIG. 1 there is illustrated by means of a block diagram the central processor section of a computer system incorporating the relative addressing features of this invention. The central processor contains all of the control, arithmetic and timing circuitry to process data. The complete computer system would further include additional central processors, input/output controllers, and peripheral devices used to supply information to and receive information from the computer via the the input/output controllers. Because the circuitry used to implement the present invention is found principally in the control section of the central processor, the arithmetic section and main memory section are simply illustrated as blocks with appropriate legends thereon. The numbered circles on various connecting lines indicate the number of conductors within a cable to handle the parallel transfer of data between registers in a computer incorporating the invention.

Each central processor utilized in the system has an Instruction bus 10 and an Operand bus 12, each of which may consist of a plurality of data lines and command lines. These two busses enable communications between the central processor and the main memory 14.

Included within the control section of the computer is a Control Memory which is shown enclosed by the dashed line box 16. The Control Memory 16 is preferably a random-access, semiconductor flip-flop memory consisting of a plurality of addressable storage registers. However, other binary storage devices are suitable and no limitation to semiconductor flip-flop storage is intended. These registers store accumulator data and data used for modifying the operand address portion of instruction words. More specifically, included within the control memory 16 is a bank of Index (B) Registers 18 and a bank of Base (S) Registers 20. Access to the high speed Control Memory 16 requires less time than access to the main memory 14 and, as such, access to the Control Memory is performed as part of the control section sequence while the master timing oscillator is running. The contents of any particular Index Register 18 or Base Register 20 may be selected by means of the address select logic for each of the register groups. More specifically, the B-Address Selector Logic 22 selects one of a plurality of B-registers in the bank 18. The particular B-register chosen is determined by a translation of a combination of designator bits of the instruction word, all as will be described hereinbelow when the format of the instruction word is discussed. The manner in which various bits of an instruction word can be decoded and used to select one of a plurality of storage registers is well known in the computer arts and further explanation is deemed unnecessary.

In the same way that the B-Address Selector Logic 22 is used to uniquely select one of a plurality of index registers in the bank 18, the S-Selector 24 is used to uniquely select one of a plurality of base registers in the bank 20 of the Control Memory 16. Again, the instruction word (yet to be described) includes a number of bits comprising a designator which when acted upon by the S-Selector 24 uniquely selects one of the S-registers in the bank 20.

Figure 3:
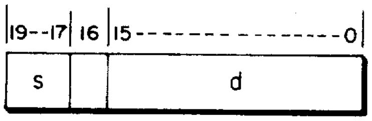
FIG. 3 illustrates the format of a word stored in the Program Control Register.

Also included in the control section of the computer is a Program Control register 26 (P-register) which, as shown in FIG. 3, may comprise a 20-bit register with the three mostsignificant bits used to store binary signals of a first significance to identify one of the plurality of base registers in the bank 18 and the remaining stages may contain signals of a second significance representing the relative address of the next instruction. This lower field, herein termed the d-field, is normally increased by one in preparation for acquisition of the next instruction each time a current instruction is executed. However, in the case of so-called Jump Instructions, a new address -an address out of the normal sequence-may be placed in the P-register. That is, either the $P_s$ or the $P_d$ field can be changed when a transfer to another routine is effected.

The control section of the central processor also includes a pair of adders 28 and 30 which take part in the operations involved in instruction execution. Various fields from the instruction register and other addressable registers must be interpreted and their functional definitions combined to form addresses and arithmetic operands. Adder 28 is referred to as the Index Adder and is a one's complement adder serving a number of functions. First of all, it adds +1 to the instruction address from the P-register 26, during an "Advance P" operation, to form the address of the next instruction. Secondly, it is used to add the contents of a selected one of the B-registers in the bank 18 to the basic operand address portion of the instruction word during an indexing or B-boxing operation.

Adder 30, termed the Base Register Adder is a two's complement adder employed to add the contents of one of the base registers in bank 20 to the data received from the Index Adder 28. An explanation of the operation of these two adders will be described in further detail in connection with FIG. 4 when the indexing and base relative addressing operations are more particularly set forth.

The Y-register 32 serves mainly as a holding register for making instruction and operand breakpoint comparisons. In this capacity, it receives the modified instruction or operand address from the adder. The H-register 33 serves merely as a transfer register for routing the instruction address, modified by an "Advance P" operation, to the Control (C) register 34 and back to the P-register 26.

The C-register 34 serves as an interface register between the various sections of the central processor. MOre specifically, it serves as an interface between the arithmetic section and the control section, the control memory to the control section, and between registers at In one computer in which the present invention is incorporated, the control section itself. The C-register 34 is 32 bits in length. It is adapted to receive input data from and transmit output data to the various registers as is illustrated by the various input and output connections therefrom.

Figure 2:
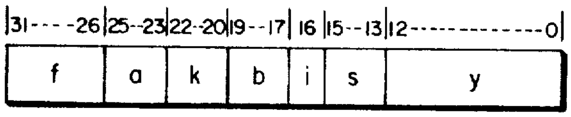
FIG. 2 illustrates the format of the instruction word used in the computer system of FIG. 1.

The format of the instruction word utilized in the computer in which the present invention is used is illustrated in FIG. 2. As shown, the entire instruction word includes a plurality of designators *f*, *a*, *k*, *b*, *i*, *s*, and *y*. The *f*-designator is the function code and specifies the operation to be performed. The *b*-designator comprising bits 17 through 19 is used to specify or address the various registers in the index register bank 18 of the control memory. The *s*-designator occupying bits 13 through 15 of the instruction word is used to select a given one of the base registers in bank 20 of the control memory. The 13 bit *y*-field can be considered as the operand designator and furnishes the basis for operand address generation. In combination with the contents of the *s*-field, it defines a constant that may be modified to form either the actual operand, a jump address, an indirect address or a series of identifier bits. Because the *a*, *k* and *i* designators are not involved in the relative addressing features of the present invention, nothing further need be said about them or their use within the computer in which the present invention is used.

The Instruction register is indicated generally by numeral 36 and includes two segments, namely, the U-Lower register 38 and the U-Upper register 40. The U-register 36 holds the instruction being executed so that translation of the various portions of the instruction word contained can take place. Segments 38 and 40 may be 16 bits in length and together form a 32 bit register. Generally, the instruction function code and various designators are contained in the U-Upper register 40 and the main memory address of the operand to be processed is maintained in the U-Lower register 38 in relative form. During normal program operation, instructions enter the U-register 36 from main memory via the Instruction Bus 10. In particular, instruction words stored in the main memory 14 are addressed by the contents of the Auxiliary Program register 41 (also referred to as the P*-register), which holds the address of the next sequential instruction of the program. The address is routed over the Instruction Bus 10 by way of the Instruction Bus Drivers 42. The Instruction Bus 10 consists of two groups of bit lines and each group is capable of transferring 16 bits. The first group of lines is bidirectional in nature, i.e., it transmits both the 16-bit instruction address from the P*-register 41 to the main memory 14 and also the lower 16 bits of the instruction itself from the main memory 14 to the U-Lower register 38. The second group of lines is unidirectional in nature, transmitting only the upper 16 bits of the instruction from the main memory 14 to the U-Upper register 40.

Once an instruction is loaded into the instruction register 36, it is available to the *V*-Translator logic 44 and the U- or P-selector logic 46 for subsequent function code translation and operand addressing.

The M-register 48 serves as an operand interface register between the central processor and main memory 14. In this regard, it transmits or receives an operand address or an operand itself from either the control section or arithmetic section for operand acquisition, read, or store operations. The M-register of the preferred embodiment is 32 bits in length; each bit-stage driving a bidirectional Operand Data Bus 12 by way of Operand Drivers 50. During an operand acquisition operation, the M-register 48 receives an 18 bit operand address from the adder 30 and transmits it to the memory via the bus 12. During an operand read operation, the operand acquired by an operand address is transmitted from memory 14 to the register 48 by way of the bus 12 for later transfer to the arithmetic section of the central processor. During an "operand store" operation, data from the arithmetic section is routed to the M-register 48 for subsequent transfer to the main memory.

The U-translator 52 is used for modification (indexing) of the *y*-operand under program control. For normal instruction *y* modification, bits 19, 18 and 17 of the U-register 36, i.e., the b-designator bits, select the B-register in the Control Memory 16.

Figure 4:
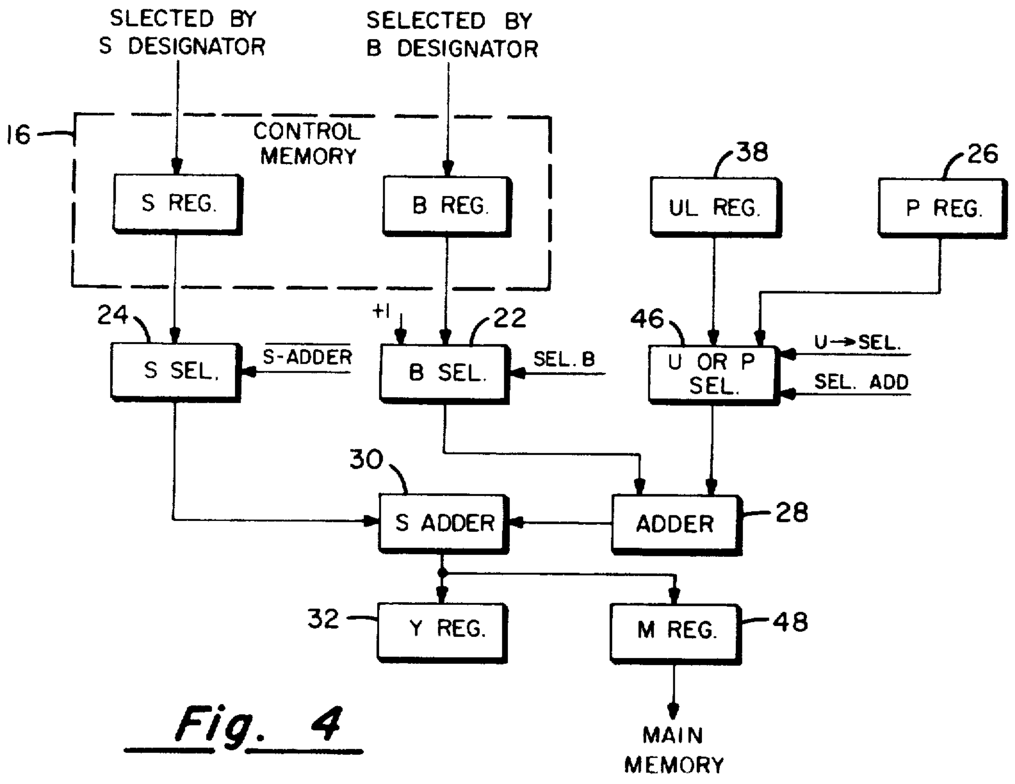
FIG. 4 illustrates by means of a block diagram the manner in which instruction addresses are generated.

Now that the various operational registers utilized in the central processor have been described in terms of their function, consideration will now be given to the manner in which the y-field of an instruction may be modified under program control with the aid of FIG. 4.

As has already been indicated, the *y*-field of the instruction word occupies bits 0 through 12 of the U-Lower register 38. In an indexing operation, the operand designator is modified by having adding to it the contents of one of a plurality of index registers and/or base registers which are located in the control memory 16. Selection of a particular B or S register is determined by the b and s designators of the instruction word. A particular B-register is selected by translation of a combination of 3 bits. Upon receipt of a command enable signal (SEL B) from the computer timing chain (not shown) the B-selector logic 22 gates data from the selected B-register in Control Memory for transfer to the adder 28. The operand designator from the U-Lower register 38 is gated to a second input of the adder 28 via the U or P selector logic 46. When an enable signal appears on the U-SEL line the *y* address, zero extended, will be added to the contents of the selected B-register in the adder 28. The zero extended output of the adder 28 and the contents of a selected S-register are transmitted to the input of the adder 30 and the resulting sum would be entered into the M-register 48 where it becomes the absolute address and is available to select a particular register in main memory. Operand address modification through the addition of a selected one of a plurality of index register contents is referred to in the art as B-boxing or indexing and is quite conventional. Furthermore, an exemplary computer incorporating control circuits for producing command enable signals at a desired time is described in the Ehrman et al U.S. Pat. No. 3,243,781.

The operand address *y* may also be modified by having adding to it the contents of a base register as well as the contents of an index register. To accomplish this, the contents of the adder 28 is applied as a first input to the S-adder 30 along with the output from the S-register selector 24. The sum, $Y = y + B_b + S_s$ is transmitted to the Y-register 32 and to the M-register 48. When the operand address field is to be used in an unmodified form, it is only necessary to select a particular B-register and S-register which has all zeros for its contents.

The Program Address Register (P-register 26) contains the Instruction address information in two distinct fields. A relative address, advanced each time an instruction is executed, is held in the *d*-field (FIG. 3). The s-field specifies one of eight base registers which may be used to modify the relative address, *d*, to produce the effective address. The same circuitry that is used to modify the operand address designator, *y*, is also used to permit modification of the *d*-designator (the displacement designator) of the P-register. Specifically, bits 0 through 15 of the P-register 26 are applied to a second input of the U or P Selector 46, which in turn is applied as an input to Adder 28. When used for instruction address modification, +1 will be applied to the Adder 28 from the B-Select logic 22 such that the modified contents of the d-designator are applied as a first input to the S-adder 30. At the same time, the contents of one of a plurality of base (S) registers is gated through the S-Select logic 24 and applied as a second input to the Adder 30. The particular one of the S-registers in the bank 20 selected is determined by the bit permutation of the *s*-designator portion of the program control register. The Adder 30 therefore serves to add the content of the selected base register to the modified *d*-designator of the program control register with the result being placed in Y-register 32.

With the foregoing description of the various registers utilized in the central processor thus described and in mind, consideration will now be given to the manner in which programs stored in the computer memory may be effectively moved about by advantageously making use of the fact that the P-register contents, i.e., the address of the next instruction, is maintained in relative form.

Figure 5:
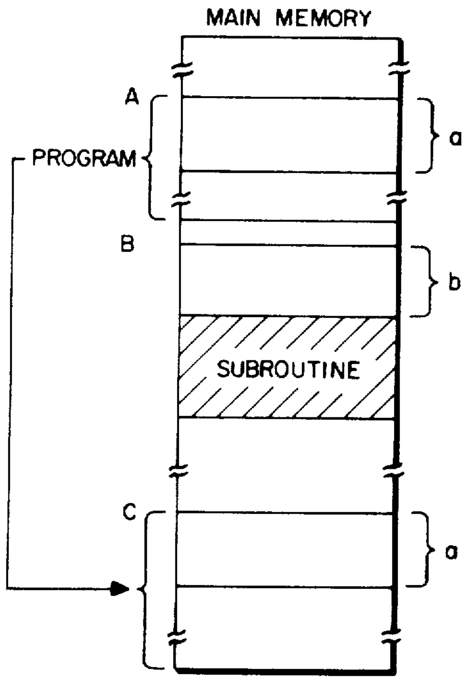
FIG. 5 illustrates a typical memory address assignment for programs in the memory of the computer.

The main memory unit 14 of the computer system stores operational programs and data on which the computer system is to perform computations. FIG. 5 illustrates schematically a portion of the main memory showing the memory address assignments for a particular program. To illustrate the manner in which programs can be relocated within the memory by utilizing the present invention, let it be assumed that a program to be executed by the computer is stored in the main memory starting at an address A and that after executing a number of sequential instructions an exit is made to a subroutine which has its initial instruction stored at an address displaced an amount b from another arbitrary address B. Further assume that before the subroutine can be completed, the Executive routine directs that the initial program is to be relocated starting at an address C. Upon completion of the subroutine it is desired to exit from the subroutine back to the point in the main program where instruction execution left off.

Table I below illustrates the contents of the program register 26 (P-Reg.), one of the index registers in bank 18 (Index Reg. 3) and the contents of two of the base registers in the bank 20 at various critical points in the execution of the program operations assumed above. The capital letters in the table denote base register values while lower case letters denote displacements.

TABLE I

| P-Reg. | | Index Reg. 3 | | Base Reg. 1 | Base Reg. 2 |
|---|---|---|---|---|---|
| *s* | *d* | *s* | *d* | | |
| 1 | ⋮ | 0 | 0 | A | B |

| | | | | | | |
|---|---|---|---|---|---|---|
| 1 | | *a* | | | | |
| 2 | | *b* | 1 | *a* | A | B |
| | ⋮ | | | | C | B |
| 1 | | *a* | 1 | *a* | C | B |
| | ⋮ | | | | | |

In running the program, the address of the first instruction must be entered into the P-register 26. In accordance with the teachings of the present invention, the instruction address is maintained in relative address format so that in forming the absolute address the contents of a base register identified by the *s*-designator of the P-register is added to the displacement designator, *d*. Referring to Table I, the first instruction in the program would be found at address A since address A is stored in Base Register No. 1 which is specified by the *s*-designator of the P-register. Because the displacement value, *d*, is zero, the initial instruction of the program will be obtained from address A. After acquiring an instruction, the displacement value, *d*, in the program control register 26 is automatically incremented by one count so that further sequential instructions will be obtained and executed. After a number of these sequential instructions have been executed (as represented in the table by the vertical column of dots) the count will proceed to a displacement value, *a*. At this point the instruction address would constitute the sum of the value in base register 1 (signified by the s designator) and the displacement value, *a*. Under the assumptions made above it is at this point that the program exits to a subroutine whose initial address is displaced *b* instructions from address B.

Referring to the table, the jump to the subroutine causes the contents of the program control register P to be stored in Index Register No. 3. It is to be understood however that this is a completely arbitrary assignment and that any of the other index registers in the bank 18 could have been used. At the same time, the jump instruction forces a new relative address into the P-register 26. Referring to the table, it can be seen that the absolute address of the first instruction of the subroutine is found by adding the contents of Base Register No. 2, i.e., B, to the displacement value *b*. Upon each successive instruction execution in the subroutine, the displacement designator will be incremented.

In explaining the program relocation feature achieved through the use of the Present invention, it was assumed that before this subroutine could be completed, the main program had to be relocated in the memory starting at an address, C. This program relocation in the memory can be readily achieved by merely changing the contentS of the Base Register No. 1. That is, the contents of Base Register N. 1 merely need be changed from address A to address C. Thus, it is not necessary to completely recode the entire program simply because it was being relocated within the memory.

Upon completion of the subroutine, a return jump is executed by transferring the contents of the Index Register No. 3 back to the P-register 26. Now when the absolute address for the next instruction is computed by summing the contents of the specified base register with the displacement value it will be seen that the main program will be resumed at the instruction located at an address displaced a number, *a*, from address C. As can be seen from FIG. 5 and Table I, this is the exact point at which the exit from the main program was made at the time that the subroutine was entered.

From the foregoing example as explained with the aid of FIG. 5 and Table I, it can be seen that several advantages result from maintaining the program address register in a relative address format. First of all, as has already been mentioned, it was not necessary to recode the program in order to affect its relocation. Secondly, it was not necessary in coding the main program to specify the exact location of the first address of the subroutine. The subroutine was entered by merely specifying its relative address (Base Register No. 2 and displacement, *b* in the example). Thirdly, when the main program was relocated, it was not necessary to search out and modify the address at which the main program would be re-entered from the subroutine. This task was accomplished by changing the contents of Base Register No. 1.

Having described the operation of the preferred embodiment of this invention and having fully set forth the advantages thereof, what is intended to be protected by letters patent is set forth In the appended claims.

What is claimed is:

1. In a digital computer, the comblnation comprising:

a. a memory for storinG a program of instructions and operands at addressable locations therein;

b. a plurality oF discrete base storage registers for storing in relative form addresses in said memory, program control register means for storing digital signals of a first significance for identifying one of said plurality of base storage registers and of a second significance for representing the relative address to be used in acquiring the next instruction;

d. adder means having first and second inputs and an output;

e. means responsive to said signals of first significance for uniquely selecting one of said plurality of base storage registers and applying the contents thereof to a first input of said adder means;

f. means for applying said signalS of second significance to the second input of said adder means; and g. means connected to the output of said adder means for selecting the instruction stored at the particular memory location defined by the sum of said contents of said uniquely selected one of said base storage register and said signals of second significance as the next instruction to be executed by said computer.

2. Apparatus as in claim 1 and further including means for incrementing said signals of second significance each time the next instruction is selected.

3. In a digital computer of the type having a memory for storing a program of instructions and operands at addressable locations therein, apparatus for generating the address of the next instruction to be selected from said memory, comprising:

a. a plurality of discrete base storage registers for storing address modifying signals therein;

b. a program control register having first and second sections for at least temporarily storing signals of first and second significance, said signals of first significance identifying a given one of said plurality of base storage registers, said signals of second significance representing the relative address of said next instruction;

c. adder means;

d. means responsive to the signals of first significance stored in said first section of said program control register for uniquely reading out the contents of one of said plurality of base storage registers to one input of said adder means;

e. means for applying said signals of second significance to a second input of said adder means; and f. means responsive to the output of said adder means for accessing the particular instruction stored in said memory at the address represented by the sum of the signals applied to said first and second inputs of said adder means.

4. Apparatus as in claim 3 and further including means for incrementing the signals of second significance stored in said second section of said program control register each time a new instruction is selected from said memory.

* * * * *